UNITED STATES PATENT OFFICE.

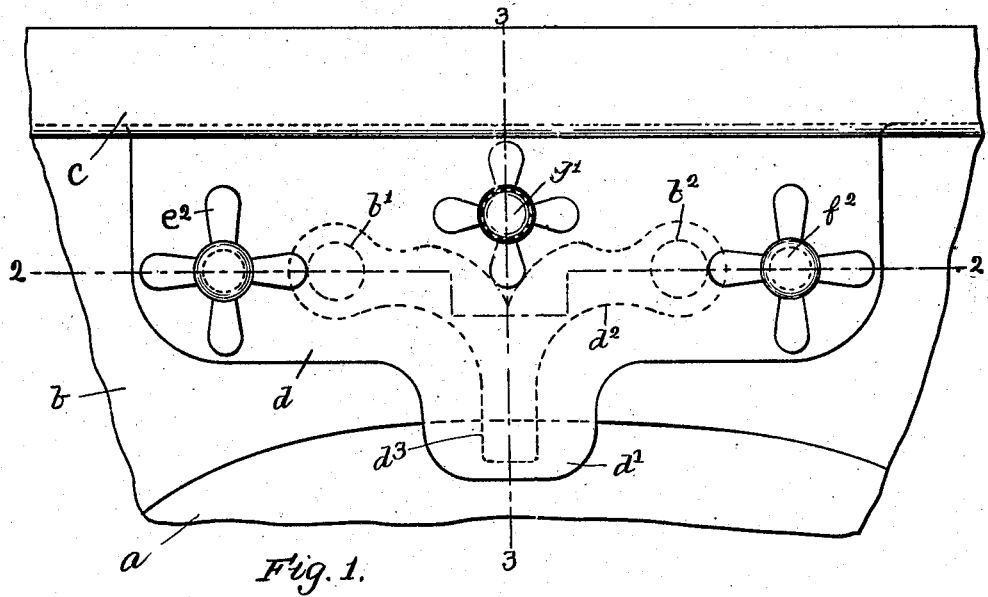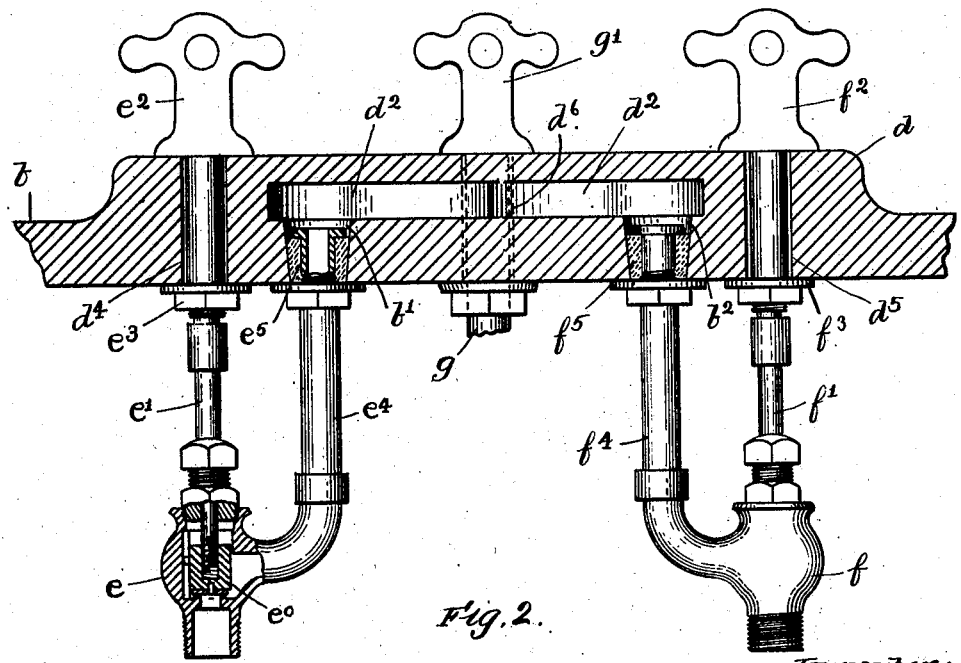

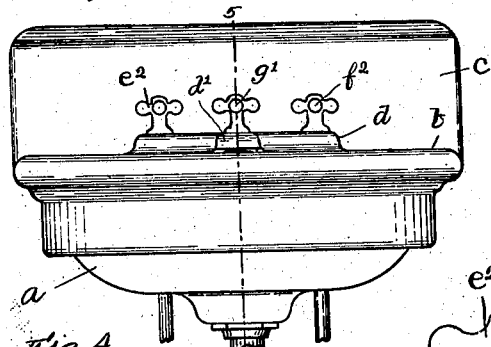
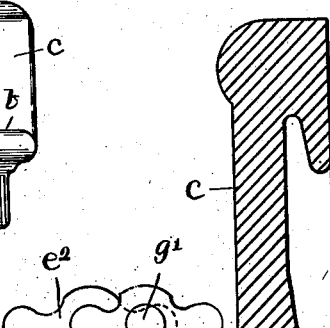
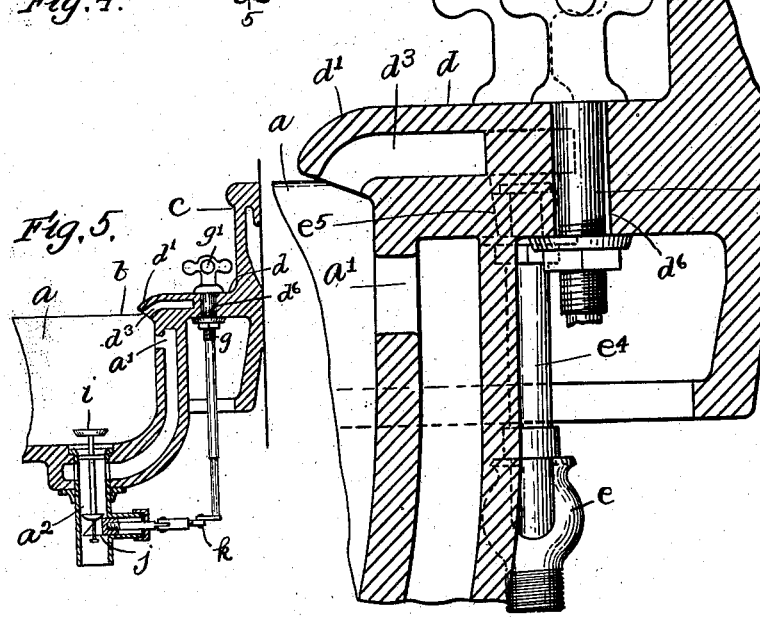
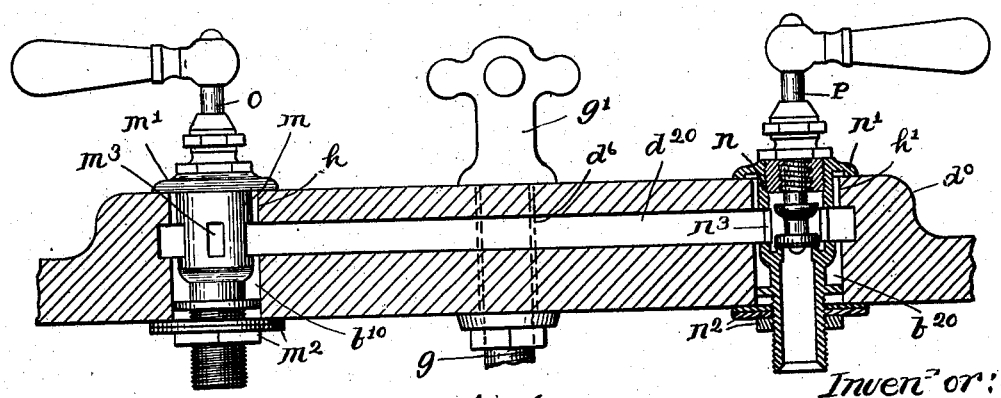

WILLIAM BUNTING, JR., OF BROOKLINE, MASSACHUSETTS.

LAVATORY.

No. 924,598.

Specification of Letters Patent.

Patented June 8, 1909.

Application filed January 6, 1909. Serial No. 470,942.

*To all whom it may concern:*

Be it known that I, WILLIAM BUNTING, Jr., of Brookline, county of Norfolk, State of Massachusetts, have invented an Improvement in Lavatories, of which the following is a specification.

This invention relates to certain improvements in lavatories or set basins, particularly of the character in which the basin and slab are cast or molded in one integral piece, and are adapted to be provided with hot and cold water supply and waste apparatus.

It is very desirable in lavatories to provide a single discharge for the hot and cold water supply, so that mixed hot and cold water may be discharged from such outlet and it is almost universally demanded by the trade that the discharge be at the level of, or above the basin rim. These results have usually been accomplished in one of two ways:— first: by providing two separate valves in the hot and cold water supply, respectively, and connecting the discharge from the casing of said valves to a common pipe, which is arranged to discharge into the lavatory, and which thereby becomes a mixing chamber, so that, by proper manipulation of the two valves, water at the desired temperature may be discharged, and second; by providing a combined hot and cold water supply valve which is adapted to control both hot and cold water ports, so that the casing of the valve itself becomes a mixing chamber and the discharge therefrom will be mixed hot and cold water. The first method involves an expense for piping, coupling and special castings and fittings, which causes the cost to exceed that of two independent faucets to a considerable extent, while the second method involves an increased cost over the first method, on account of the additional difficulty and expense in manufacturing the valve.

It is practically essential that the overflow and waste apparatus be located in the middle plane of the bowl. What are known as concealed overflows, and also overflow pipes, are considered undesirable as they become foul, so that the general demand of the trade is for an overflow passage which is formed in the wall of the bowl. The ordinary chain and plug waste stopper is only used in the bowls of the less expensive kind, and the general demand of the trade is for a waste operating mechanism which is not only located in the middle plane of the bowl but is also adapted to be operated by a handle located above the level of the slab.

In connecting a mixed hot and cold water supply apparatus to a bowl difficulty is experienced in running the pipes and arranging the fittings so as to avoid the overflow and waste devices, this being principally due to the fact that it is desired that both the overflow and waste apparatus and the discharge pipe from the mixing chamber be arranged in the middle plane of the bowl.

The objects of my invention are to provide a lavatory or set basin which is of improved appearance, and which may also be installed at a smaller total expense than lavatories of a similar character, and which further enables mixed hot and cold water to be discharged into the basin by means which are even less expensive than two separate faucets which independently discharge into the basin.

A further object is to provide a lavatory in which all metal parts of the water supplying means may be concealed beneath its slab, so that, by making the water-supply and waste handles of porcelain, the general appearance of the lavatory may be greatly improved, and the difficulty of keeping it clean and in first class condition is greatly lessened.

A still further object of my invention is to provide a lavatory in which an overflow and waste apparatus of the most desirable form and a mixed hot and cold water discharge pipe may be arranged in the middle vertical plane of the bowl without interference, or causing inconvenience or extra expense in making the connections.

I accomplish these objects by providing a raised portion in the basin slab in which an inlet chamber is formed having a discharge passage, or mixing chamber, leading into the basin above, or at the level of its rim, and by so connecting the hot and cold water supply pipes to said chamber, that the discharge passage therefrom will act as a mixing chamber and deliver the mixed hot and cold water to the basin, and further by arranging the overflow passage in the rear wall of the bowl directly beneath said discharge passage, and providing a waste valve operating means which extends from the waste pipe up through the slab in the rear of said inlet chamber.

For a complete understanding of my invention, reference is made to the accompanying drawings, in which, Figure 1 is a plan view of the rear portion of a basin embodying my invention. Fig. 2 is a vertical section on the line 2—2 of Fig. 1. Fig. 3 is a vertical section on the line 3—3 of Fig. 1. Fig. 4 is a front elevation on a small scale, of a basin embodying my invention. Fig. 5 is a sectional view on the line 5—5 of Fig. 4, of the rear portion of the bowl. Fig. 6 is a sectional view taken at the line corresponding to the sectional line 2—2 of Fig. 1, and illustrating a modified form of my invention.

As shown in the drawing, the main body of the bowl $a$ is provided with a horizontal, or slab portion $b$, and an upright wall portion $c$, all of said parts being cast or molded in one integral piece. An overflow passage $a'$ is formed in the middle of the rear wall of the bowl, and opens through said wall into the bowl a short distance below the rim of the bowl, and at its lower end is connected to the outlet pipe $a^2$, in the usual manner.

According to my invention I provide in the middle portion of the slab $b$ a raised portion $d$, which is located above the level of the slab, and extends forwardly from the wall portion $c$, the surface thereof being horizontal and its edges being curved downwardly, and reversely at its sides, and upwardly at its rear end, so that its surface is continuous with the surface of the slab $b$ and wall portion $c$. Said raised portion $d$ extends transversely of the bowl for a suitable distance at each side of the middle line of the bowl, as shown, and also extends forwardly, from the wall portion $c$, to within a short distance of the margin of the bowl, and, at its middle portion, it is provided with a relatively narrow, forwardly projecting extension $d'$, which terminates at the inner side of the wall of the bowl adjacent the level of the upper side of the rim, and directly over the overflow inlet, the end thereof extending obliquely downward, as shown in Fig. 3, so that the front end of said extension overhangs the interior of the bowl. Said raised portion $d$ is provided with a horizontal chamber $d^2$ therein, which extends longitudinally thereof to opposite sides of the middle portion of the bowl for the greater portion of the length of said raised portion, and with a branch chamber $d^3$ which extends horizontally from the middle of said chamber $d^2$ forwardly through the extension $d'$ and opens into the bowl at the end of said extension in a slightly downwardly inclined direction.

Apertures $b'$, $b^2$ are formed in the slab which lead from the under side thereof into said chamber $d^2$ adjacent its opposite ends, said apertures preferably being so formed that they taper from the chamber $d^2$ downwardly. Apertures $d^4$ and $d^5$ are also provided which extend through the raised portion $d$ and the slab portion beneath, said apertures being preferably arranged adjacent and beyond the ends of the chamber $d^2$. An aperture $d^6$ is also provided in the slab which extends through said raised portion $d$ from the top thereof to the under side of the slab, said aperture being arranged in the rear of said chamber $d^2$ and in the middle plane of the bowl.

A pair of valves are provided, having casings $e$ and $f$, which may be respectively connected at their lower ends to the hot and cold water supply pipes in a manner which will be readily understood. While I may employ any well-known form of valve in this particular connection, I preferably employ a valve in which the operating stem is held from longitudinal movement and is rotated to open and close the valve. In Fig. 2 a valve of this character is illustrated, which comprises a valve body $e^0$, which is mounted to slide vertically and is held from rotation by suitable guideways, the valve stem $e'$ being threaded in said valve body. The valve casing $f$ is provided with a similar construction, having a valve stem $f'$. Said valve stems $e'$ and $f'$ extend upwardly from said casings in alinement with and through the apertures $d^4$ and $d^5$ respectively, handles $e^2$ and $f^2$, preferably of porcelain, being secured to the upper ends of said stems, so that they bear against the upper side of the raised portion, collars $e^3$, $f^3$ being provided on said stems to bear against the under side of the slab and hold the stems from longitudinal movement.

The valve casings $e$ and $f$ are respectively provided with lateral discharge pipes $e^4$ and $f^4$, which extend horizontally from the casing and then upwardly in alinement with the openings $b'$, $b^2$, a water-tight connection being provided between the upper ends of said branches and the walls of said apertures by any suitable means, such as the ordinary expansion joints $e^5$ and $f^5$ as shown.

A waste valve operating rod $g$ is rotatably mounted in the aperture $d^6$ and has a porcelain operating handle $g'$ at its upper end. Any suitable waste controlling means may be employed, a preferable construction being shown in Fig. 5, which comprises a valve $i$ guided to move vertically, a wedge-shaped lifting slide $j$ and a link and crank connection $k$ with the lower end of the rod $g$, whereby rotation of the rod will cause the valve to be lifted.

The valves, their connections and stems, as thus arranged, will not interfere either with the installation or operation of the other, and no special fittings are necessary to enable one to avoid the other when they are installed.

It will be apparent that, with the above described device, by manipulating either of the handles $e^2$ or $f^2$, hot or cold water may be discharged into the chamber $d^2$, from which it will be discharged into the basin through the outlet passage $d^3$, and that, if both valves are opened, mixed hot and cold water will be discharged into the basin. The chamber $d^2$ thus acts as an inlet chamber and the passage $d^3$ acts as a mixing chamber, and a mixed hot and cold water supply is thus provided for a bowl having its waste operating means in the middle plane of the bowl, by which said supply is delivered at the middle of the rear wall of the bowl, and in which all the fittings are concealed from view and only the porcelain operating handles for the water supply and waste are exposed above the level of the slab.

The chamber $d^2$ may be considered as two separate inlet chambers arranged at opposite sides of the middle plane of the bowl, and connected at their adjacent ends to the mixing chamber, or it may be considered as a single chamber to the middle of which the mixing chamber $d^3$ is connected, although, as a matter of convenience in description, it has been referred to as a single chamber. A deflector $d^6$ may be formed in the rear wall of chamber $d^2$ which aids in directing the water into the mixing chamber, and also permits the waste operating rod to be placed farther away from the back portion $c$ in which said chambers are shown in dotted outline.

In Fig. 6 I show a somewhat modified form of my invention which is less expensive to manufacture than the form already described. In this form of my invention the formation of the cast or molded bowl is substantially the same as already described with the exception that openings $h$, $h'$, are formed in the raised portion $d^0$, above the inlet chamber $d^{20}$, therein, and in line with openings $b^{10}$, $b^{20}$, through the slab, which corresponds to the openings $b'$, $b^2$, before described. The casings $m$ and $n$ are provided in said apertures $b^{10}$, $h$, and $b^{20}$, $h'$ respectively, water tight connections being provided between said casings by means of packed upper flanges $m'$, $n'$, which bear on the upper surface of the raised portion $d^0$, and the nut and packing washer connection $m^2$, $n^2$ on the lower ends of said casings. Ports $m^3$, $n^3$, are provided in said casings, which open into the chamber $d^{20}$, and valves are connected to the lower ends of the valve stems $o$, $p$, by means of which the passage from the lower ends of said casing to said ports may be controlled in a manner which will be obvious. When the hot and cold water pipes are connected to the valve casings $m$, $n$, hot and cold water will be directly discharged into the inlet chamber $d^{20}$ and thence will be conducted through the connected mixing chamber, corresponding to chamber $d^3$, and discharged into the basin, as before described. With this form of my invention I find it necessary to have the valve bonnet exposed above the level of the porcelain, but the portion of the fittings which are exposed, and must be finished and thereafter kept in order, is small as compared with the means ordinarily employed. Moreover, a mixed hot and cold water supply apparatus may be produced by employing this form of my invention, at a much less expense than with any other means of which I am aware, for the additional expense of molding, or casting the bowl, so as to form the raised portion and the chambers and passages therethrough is practically insignificant, furthermore, the valves which I am enabled to employ in this connection are materially less expensive than the ordinary faucet which is adapted to be mounted on the basin slab.

Matter shown and described in this application, but not claimed herein, is claimed in my copending application Serial No. 494,573, dated May 7, 1909.

Having thus described my invention, what I claim as new and desire to secure by Letters Patent is:—

1. A lavatory comprising an integral bowl and slab, said slab extending rearwardly beyond the middle portion of the rear wall of the bowl and having an inlet chamber formed therein between its upper and under sides, said chamber extending transversely of the bowl to opposite sides of the middle thereof, and said slab having a discharge passage leading from an intermediate portion of said chamber to the bowl and having apertures leading downwardly from the ends thereof to the under side of the slab, adapted to receive the hot and cold water supply pipes, substantially as described.

2. A lavatory comprising an integral bowl and slab, said slab extending rearwardly beyond the middle portion of the rear wall of the bowl and having an integral thickened portion in the rear of the bowl having an inlet chamber therein extending transversely of the bowl to opposite sides of the middle thereof and having a discharge passage leading from the intermediate portion of said chamber to the bowl and inlet apertures leading downwardly from the opposite ends of said chamber to the under side of the slab, adapted to receive the hot and cold water supply pipes, substantially as described.

3. A lavatory comprising an integral bowl and slab, said slab extending rearwardly beyond the middle portion of the rear wall of the bowl and having an integral raised and thickened portion in the rear of the bowl, said portion having an inlet chamber therein which extends transversely of the bowl to opposite sides of the middle thereof, having a discharge passage leading forwardly from the middle of the chamber and opening above the rim of the bowl to direct the water therein, and having apertures leading downwardly from the ends of said chambers to the under side of the slab and adapted to receive the hot and cold water supply pipes respectively, substantially as described.

4. A lavatory comprising a bowl and slab, said slab having an integral raised portion in the rear of the bowl and extending for a portion of the width of the bowl at opposite sides of the middle thereof, and said raised portion having an extended portion which projects forwardly from the middle thereof and terminates at the rim of the bowl, said raised portion having an inlet chamber therein which extends transversely of the bowl to points adjacent the ends of said raised portion and its extended portion having a mixing chamber leading from the middle portion of said inlet chamber into the bowl, the slab portion beneath said raised portion having openings leading from the under side thereof into the opposite ends of said inlet-chamber and adapted to receive the hot and cold water supply pipes, substantially as described.

5. A lavatory comprising a bowl and slab, said slab having an integral raised portion in the rear of the bowl, said raised portion having an inlet chamber formed therein and extending transversely of the bowl to opposite sides of the middle thereof and having a mixing chamber leading forwardly from the middle portion of said inlet chamber and opening at its front end into the bowl at the level of its rim, said slab having supply passages leading therethrough from the under side thereof to said inlet chamber adjacent its opposite ends, and water supplying means for said supply passages comprising a pair of valves having operating stems extending upwardly through the slab and said raised portion, substantially as described.

6. A lavatory comprising a bowl and slab, said slab having an inlet chamber therein, the rear of the bowl, extending transversely of the bowl to opposite sides of the middle thereof, and having a mixing chamber leading forwardly from the middle portion of said inlet chamber and opening at its front end into the bowl and said slab having supply passages leading therethrough from beneath the same to said chamber adjacent its ends, water supply means comprising a pair of valves having vertically disposed operating rods extending upwardly through the slab beyond the ends of said chamber and having discharge pipes leading therefrom and connected to said supply passages, substantially as described.

7. A lavatory comprising a bowl and slab, said slab having a mixing chamber formed therein and opening into the bowl, said chamber extending rearwardly and branching transversely in opposite directions, and said slab having an opening leading from the inner end of each branch chamber to the under side thereof, hot and cold water supply pipes respectively connected to said openings and waste controlling devices, located in the middle plane of the bowl between said supply pipes, substantially as described.

8. A lavatory comprising a bowl and slab, said slab having an overflow passage formed in the middle portion of the rear wall thereof and opening into the bowl below the rim, and the slab having an inlet chamber formed therein and opening into the bowl directly above the overflow inlet, said inlet chamber extending rearwardly and transversely in horizontal directions and the slab having a supply pipe opening leading from the inner end of said chamber to the under side thereof, substantially as described.

9. A lavatory comprising a bowl and slab, said bowl having an overflow passage formed in the middle portion of the rear wall thereof and opening into the bowl above the rim, and the slab having an integral raised portion extending rearwardly from points directly above said overflow inlet and transversely to each side thereof, said raised portion having a mixing chamber formed therein and opening into the bowl and a transversely disposed inlet chamber connected thereto, and said slab having openings leading from beneath the same to the opposite ends of said inlet chamber and adapted to receive hot and cold water supply pipes, substantially as described.

In testimony whereof, I have signed my name to this specification, in the presence of two subscribing witnesses.

WILLIAM BUNTING, Jr.

Witnesses:
L. H. HARRIMAN,
H. B. DAVIS.